United States Patent
Ulichney et al.

(10) Patent No.: US 11,167,481 B2
(45) Date of Patent: Nov. 9, 2021

(54) MULTISCALE DENSITY THRESHOLD MATRICES FOR 3D PRINTING

(71) Applicant: Hewlett-Packard Development Company, L.P., Houston, TX (US)

(72) Inventors: Robert Ulichney, Stow, MA (US); Andrew E. Fitzhugh, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 233 days.

(21) Appl. No.: 16/098,088

(22) PCT Filed: Jul. 27, 2016

(86) PCT No.: PCT/US2016/044223
§ 371 (c)(1),
(2) Date: Oct. 31, 2018

(87) PCT Pub. No.: WO2018/022035
PCT Pub. Date: Feb. 1, 2018

(65) Prior Publication Data
US 2019/0152139 A1 May 23, 2019

(51) Int. Cl.
*B29C 64/171* (2017.01)
*B29C 64/393* (2017.01)
(Continued)

(52) U.S. Cl.
CPC .......... *B29C 64/171* (2017.08); *B29C 64/386* (2017.08); *B29C 64/393* (2017.08);
(Continued)

(58) Field of Classification Search
None
See application file for complete search history.

(56) References Cited

U.S. PATENT DOCUMENTS

| 2014/0037873 A1* | 2/2014 | Cheung | B64C 1/06 428/34.1 |
| 2014/0163445 A1 | 6/2014 | Pallari et al. | |

(Continued)

FOREIGN PATENT DOCUMENTS

| CN | 104268931 | 1/2015 |
| CN | 105033188 | 11/2015 |

(Continued)

OTHER PUBLICATIONS

Griffiths, G., Lattice Structures Simplified, http://www.tctmagazine.com/3D-software-news/lattice-structures-simplified/, Jun. 25, 2015, 8 pages.

(Continued)

*Primary Examiner* — Monica A Huson
*Assistant Examiner* — Kelsey C Grace
(74) *Attorney, Agent, or Firm* — Dicke Billig & Czaja PLLC

(57) ABSTRACT

One example includes a three-dimensional (3D) printed object including a first lattice structure and a second lattice structure. The first lattice structure includes a first matrix having a first length, a first width, and a first height. The second lattice structure includes a second matrix having a second length, a second width, and a second height. The second length times two is a factor of the first length, the second width times two is a factor of the first width, and the second height times two is a factor of the first height.

15 Claims, 8 Drawing Sheets

(51) Int. Cl.

| | |
|---|---|
| B33Y 80/00 | (2015.01) |
| B29C 64/386 | (2017.01) |
| B33Y 10/00 | (2015.01) |
| B33Y 50/02 | (2015.01) |
| B33Y 50/00 | (2015.01) |
| B29L 31/00 | (2006.01) |
| G06F 30/00 | (2020.01) |

(52) U.S. Cl.
CPC .............. *B33Y 10/00* (2014.12); *B33Y 50/02* (2014.12); *B33Y 80/00* (2014.12); *B29L 2031/772* (2013.01); *B33Y 50/00* (2014.12); *G06F 30/00* (2020.01)

(56) References Cited

U.S. PATENT DOCUMENTS

| 2016/0184898 A1 | 6/2016 | Kohav |
|---|---|---|
| 2016/0209820 A1 | 7/2016 | Banadyga et al. |

FOREIGN PATENT DOCUMENTS

| CN | 105302509 | 2/2016 |
|---|---|---|
| WO | 2014019559 | 2/2014 |
| WO | 2014188225 | 11/2014 |
| WO | 2015120429 | 8/2015 |
| WO | WO-2016066193 | 5/2016 |
| WO | WO-2017189001 | 11/2017 |

OTHER PUBLICATIONS

Baich et al., Study of Infill Print Parameters on Mechnical Strength and Production Cost-Time of 3D Printed ABS Parts, Department of Mechanical and Industrial Engineering, Youngstown State University, http://sffsymposium.engr.utexas.edu/sites/default/files/2015/2015-17-Baich, Sep. 11, 2015, 10 pages.

Li et al., Density Aware Internal Supporting Structure Modeling of 3D Printed Objects, http://ieeexplore.ieee.org/stamp/stamp.jsp?arnumber=7467238, Oct. 17, 2015, 7 pages.

Tess, TNO advances virtual material design in 3D printing with COMSOL Multiphysics, 3D Printer News & 3D Printing News, Dec. 23, 2015, 11 pages.

Wu, Jun et al. "Self Supporting Rhombic Infill Structures for Additive Manufacturing." Computer-Aided Design 80 (Jul. 25, 2016): 1-12.

Fan, Hualin, et al. "Development of Lattice Materials With High Specific Stiffness and Strength", Feb. 25, 2007, p. 99-112, vol. 37, No. 1.

* cited by examiner

MULTISCALE DENSITY THRESHOLD MATRICES FOR 3D PRINTING

BACKGROUND

Printing technologies may be used to create three-dimensional objects from data output from a computerized modeling source. For example, a three-dimensional object may be designed using a computer program (e.g., a computer aided design (CAD) application), and the computer may output the data of the design to a printing system capable of forming the solid three-dimensional object. Solid free-form fabrication (or layer manufacturing) may be defined generally as a fabrication technology used to build a three-dimensional object using layer by layer or point-by-point fabrication. With this fabrication process, complex shapes may be formed without the use of a pre-shaped die or mold.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Variable density lattices are useful for filling the interiors of three-dimensional (3D) printed objects for both reducing the weight of the object and for thermal management during fabrication. One lattice size, however, may not be appropriate for all interior volumes. Smaller or more confined interior volumes may benefit from smaller lattice structures while larger or more open interior volumes may benefit from larger lattice structures. For objects that have both tight and spacious interior spaces, a change in lattice sizes within the same object may be beneficial. Merely changing the size of the lattice structure within an object, however, may result in a weak interface between the lattice structures. In general, the weak interface is due to the struts of one lattice structure not attaching to struts of the other lattice structure. Therefore, the shell of the 3D printed object enveloping these interiors will carry the entire stress holding the object together. Without a shell, these structures would fall apart and separate at the interface between the lattice structures.

Accordingly, as disclosed herein, a system for generating a set of multiscale density threshold matrices and for rendering a multiscale 3D print is described. Finer scaled versions of lattices of the set of multiscale density threshold matrices are aligned with courser scaled versions of lattices to maintain structural integrity and strength. Scale changes occur at the border of the fundamental rectangular period of the lattices. Thus, 3D printed objects may include lattices of different sizes while maintaining structural integrity and strength.

Figure 1A:
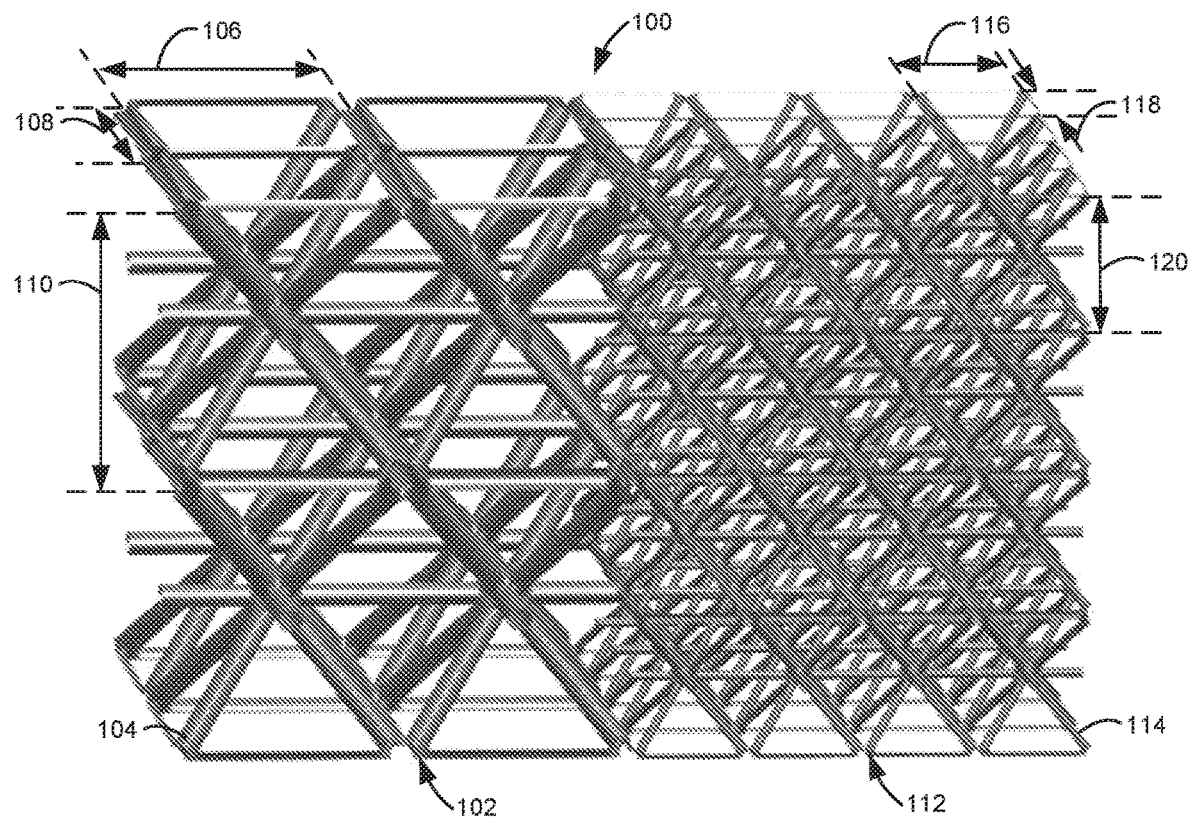
FIG. 1A illustrates one example of a three-dimensional (3D) printed object including tetrahedral matrices of two different scales.

FIG. 1A illustrates one example of a 3D printed object 100 including tetrahedral matrices of two different scales. The 3D printed object 100 includes a first lattice structure 102 and a second lattice structure 112 coupled to the first lattice structure 102. Struts of first lattice structure 102 directly contact struts of second lattice structure 112 to maintain the structural integrity and strength between first lattice structure 102 and second lattice structure 112. First lattice structure 102 includes a plurality of first matrices 104 (e.g., eight in FIG. 1A). Each first matrix 104 has a first length as indicated at 106, a first width as indicated at 108, and a first height as indicated at 110. Second lattice structure 112 includes a plurality of second matrices 114 (e.g., 64 in FIG. 1A). Each second matrix 114 has a second length as indicated at 116, a second width as indicated at 118, and a second height as indicated at 120.

In this example, the second length 116 of each second matrix 114 is one half the first length 106 of each first matrix 104. The second width 118 of each second matrix 114 is one half the first width 108 of each first matrix 104. Likewise, the second height 120 of each second matrix 114 is one half the first height 110 of each first matrix 104. Therefore, the second length 116 times two is a factor of the first length 106, the second width 118 times two is a factor of the first width 108, and the second height 120 times two is a factor of the first height 110.

In other examples, 3D printed object 100 may include a plurality of further lattice structures where each further lattice structure includes a plurality of further matrices. Each further matrix has a length, a width, and a height. The length of the further matrix times two is a factor of the first length 106, the width of the further matrix times two is a factor of the first width 108, and the height of the further matrix times two is a factor of the first height 110. Accordingly, struts of the further lattice structure directly contact struts of first lattice structure 102 and/or second lattice structure 112 to maintain the structural integrity and strength of object 100.

Figure 1B:
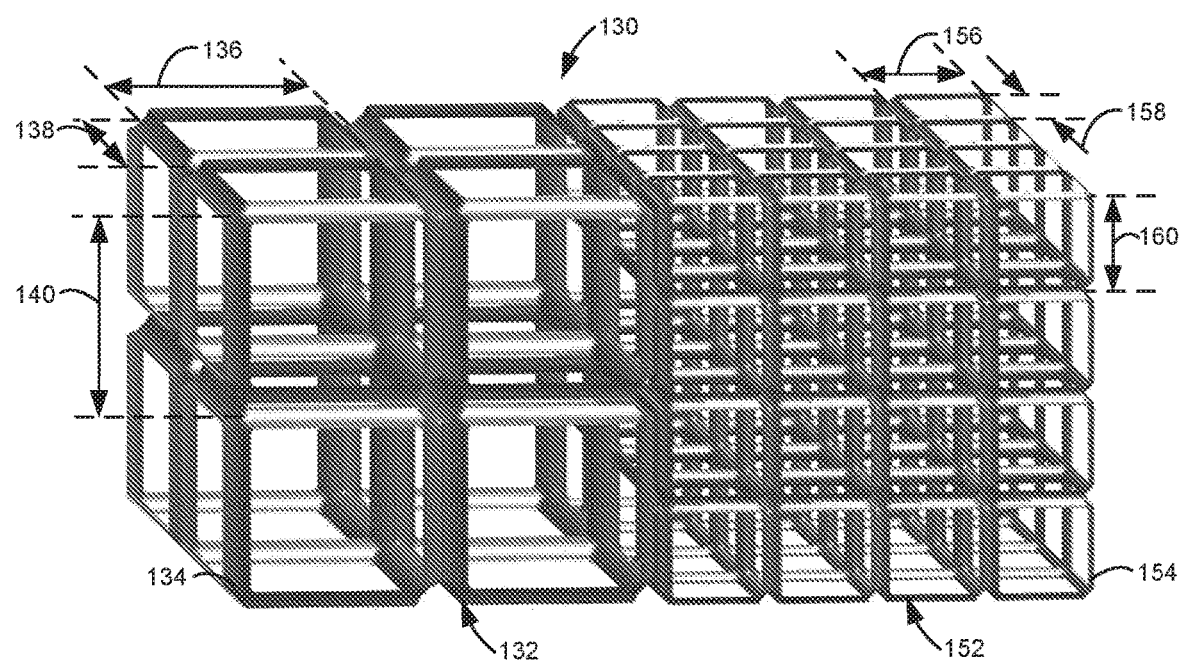
FIG. 1B illustrates one example of a 3D printed object including cubic matrices of two different scales.

FIG. 1B illustrates one example of a 3D printed object 130 including cubic matrices of two different scales. The 3D printed object 130 includes a first lattice structure 132 and a second lattice structure 152 coupled to the first lattice structure 132. Struts of first lattice structure 132 directly contact struts of second lattice structure 152 to maintain the structural integrity and strength between first lattice structure 132 and second lattice structure 152. First lattice structure 132 includes a plurality of first matrices 134 (e.g., eight in FIG. 1B). Each first matrix 134 has a first length as indicated at 136, a first width as indicated at 138, and a first height as indicated at 140. Second lattice structure 152 includes a plurality of second matrices 154 (e.g., 64 in FIG. 1B). Each second matrix 154 has a second length as indicated at 156, a second width as indicated at 158, and a second height as indicated at 160.

In this example, the second length 156 of each second matrix 154 is one half the first length 136 of each first matrix 134. The second width 158 of each second matrix 154 is one half the first width 138 of each first matrix 134. Likewise, the second height 160 of each second matrix 154 is one half the first height 140 of each first matrix 134. Therefore, the second length 156 times two is a factor of the first length 136, the second width 158 times two is a factor of the first width 138, and the second height 160 times two is a factor of the first height 140.

In other examples, 3D printed object 130 may include a plurality of further lattice structures where each further lattice structure includes a plurality of further matrices. Each further matrix has a length, a width, and a height. The length of the further matrix times two is a factor of the first length 136, the width of the further matrix times two is a factor of the first width 138, and the height of the further matrix times two is a factor of the first height 140. Accordingly, struts of the further lattice structure directly contact struts of first lattice structure 132 and/or second lattice structure 152 to maintain the structural integrity and strength of object 130.

Figure 2:
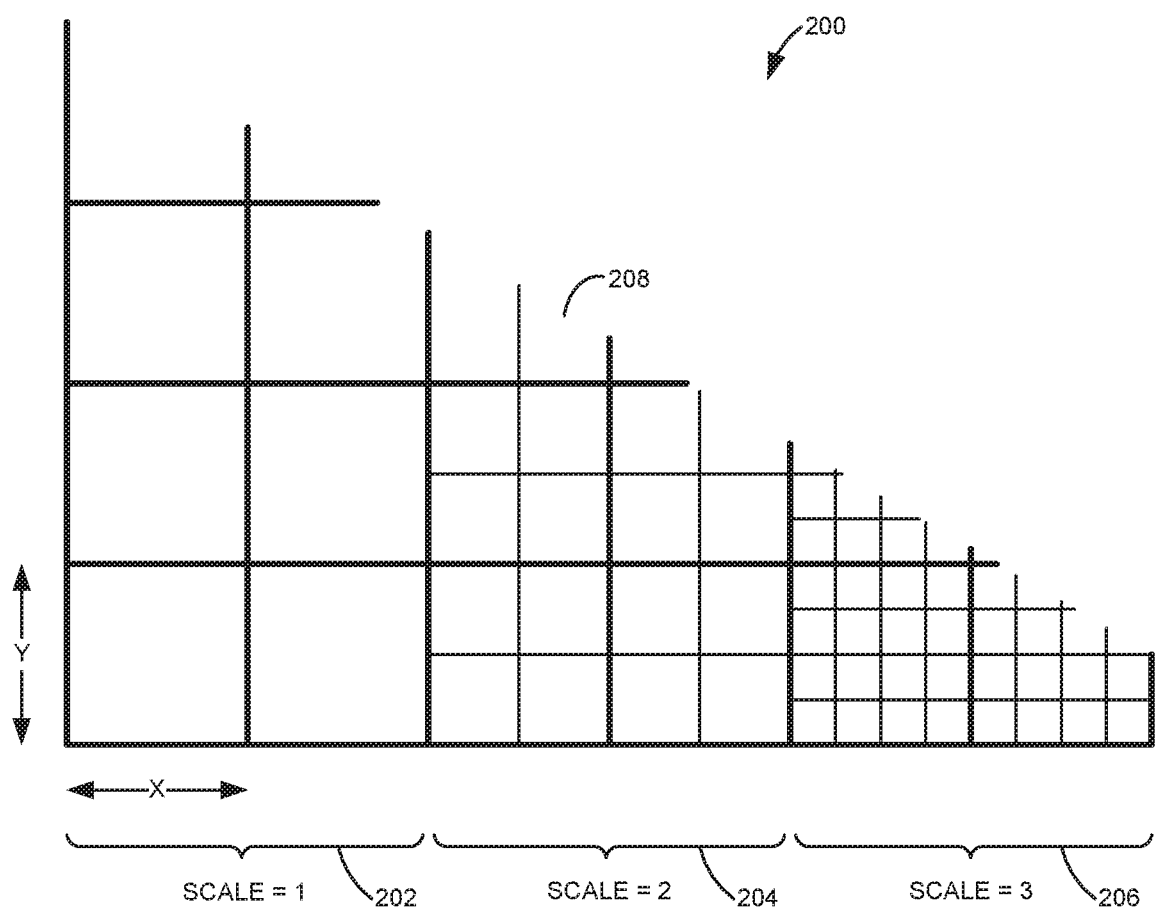
FIG. 2 is a diagram illustrating one example of lattice scales of an object as a function of spaciousness.

FIG. 2 is a diagram illustrating one example of lattice scales of an object 200 as a function of spaciousness. FIG. 2 illustrates a two-dimensional slice of an object where the extent of lattice periods are outlined. An actual shape of the lattice is not shown. The density lattice is represented by an X by Y repeating period depicted by the thicker lines in FIG. 2. The group of periods indicated at 202 are scale=1, which represent the largest scale structure where a single instance of the lattice fills each X by Y period. The group of periods indicated at 204 are scale=2, which represent a 2 by 2 smaller version of the largest scale structure such that four instances of the lattice fills each X by Y period. Likewise, the group of periods indicated at 206 are scale=3, which represent a 4 by 4 smaller version of the largest scale structure such that 16 instances of the lattice fills each X by Y period. In this example, the larger lattices fill the more spacious area and the smaller lattices fill the less spacious area. A partial lattice may fill the area near the edge of the object as indicated at 208. Structural integrity is achieved by forcing scale changes at the border of the fundamental X by Y period as illustrated in FIG. 2 and by making smaller versions of the lattice with the same shape as larger versions of the lattice.

Figure 3A:
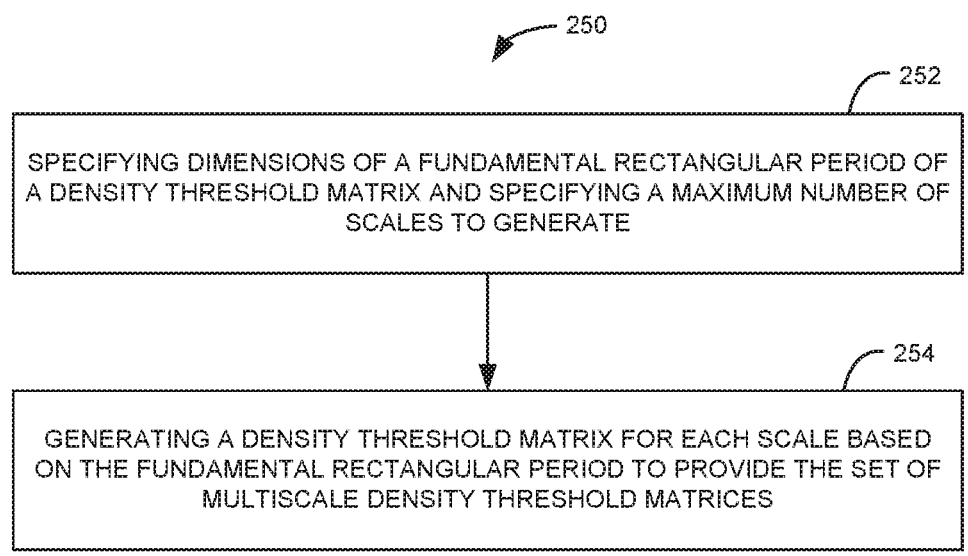
FIG. 3A is a flow diagram illustrating one example of a method for generating multiscale density threshold matrices for 3D printing.

FIG. 3A is a flow diagram illustrating one example of a method 250 for generating multiscale density threshold matrices for 3D printing. In one example, method 250 is performed by a processor, such as processor 402, which will be described with reference to FIG. 4. At 252, method 250 includes specifying dimensions of a fundamental rectangular period of a density threshold matrix and specifying a maximum number of scales to generate. At 254, method 250 includes generating a density threshold matrix for each scale based on the fundamental rectangular period to provide the set of multiscale density threshold matrices.

Figure 3B:
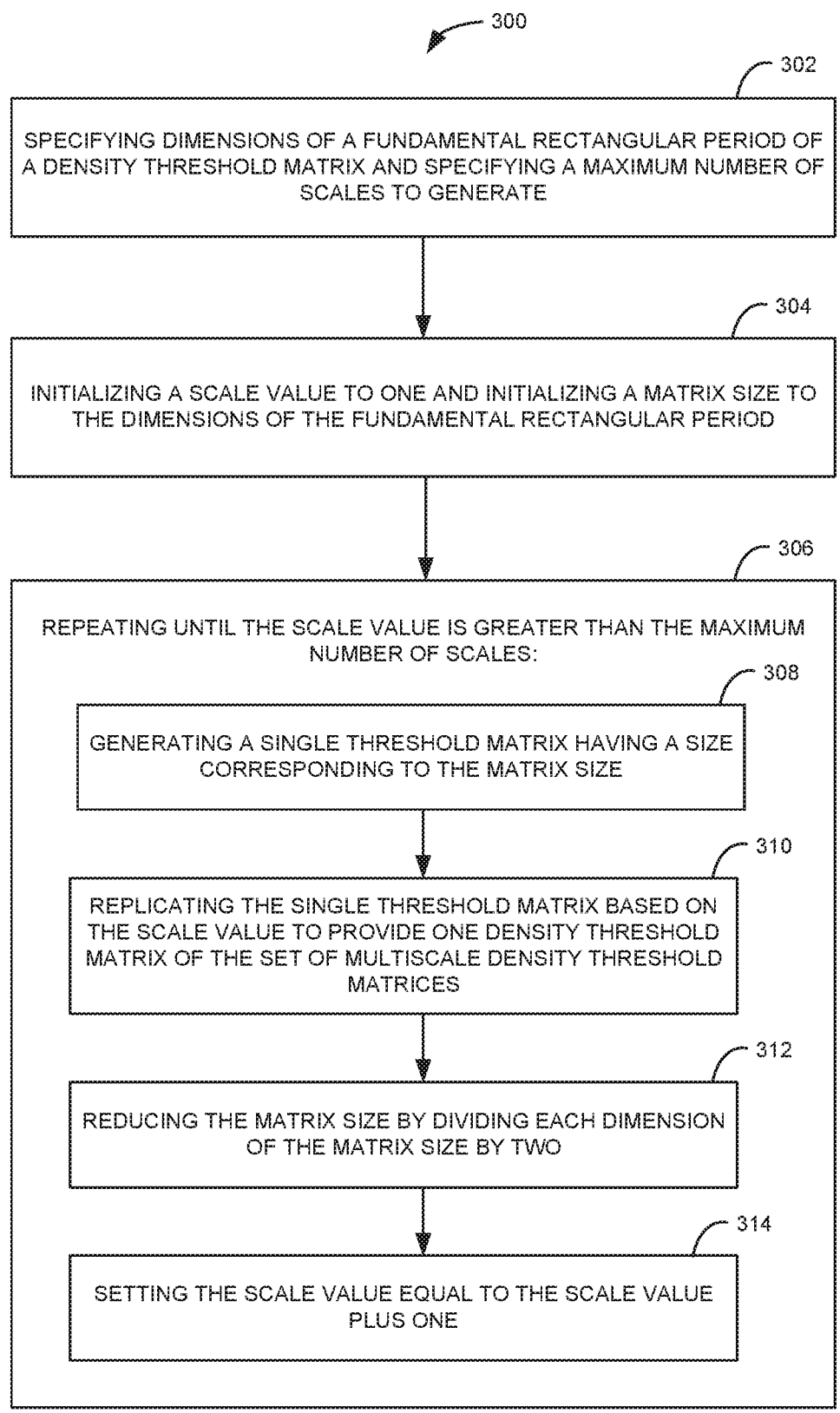
FIG. 3B is a flow diagram illustrating another example of a method for generating multiscale density threshold matrices for 3D printing.

FIG. 3B is a flow diagram illustrating another example of a method 300 for generating multiscale density threshold matrices for 3D printing. In one example, method 300 is performed by a processor, such as processor 402, which will be described with reference to FIG. 4. At 302, method 300 includes specifying dimensions of a fundamental rectangular period (e.g., X by Y by Z) of a density threshold matrix and specifying a maximum number of scales ($S_{MAX}$) to generate. The maximum number of scales should be greater than one to generate multiscale density threshold matrices for an object having more than one lattice structure. In one example, each of the dimensions of the fundamental rectangular period is a factor of two to the power of the maximum number of scales minus one (i.e., $2^{S_{MAX}-1}$). At 304, method 300 includes initializing a scale value to one and initializing a matrix size to the dimensions of the fundamental rectangular period.

At 306, method 300 includes repeating 308, 310, 312, and 314 until the scale value is greater than the maximum number of scales. At 308, method 300 includes generating a single threshold matrix having a size corresponding to the matrix size. At 310, method 300 includes replicating the single threshold matrix based on the scale value to provide one density threshold matrix of the set of multiscale density threshold matrices. In one example, replicating the single threshold matrix includes replicating the single threshold matrix by two to the power of the maximum number of scales minus one (i.e., $2^{S_{MAX}-1}$) for each dimension of the single threshold matrix.

At 312, method 300 includes reducing the matrix size by dividing each dimension of the matrix size by two. At 314, method 300 includes setting the scale value equal to the scale value plus one. Method 300 then returns to 308 and the process is repeated until the scale value is greater than the maximum number of scales. In one example, the set of multiscale density threshold matrices define a set of tetrahedral matrices or a set of cubic matrices. In other examples, the set of multiscale density threshold matrices may define a set of matrices having another suitable shape.

Figure 4:
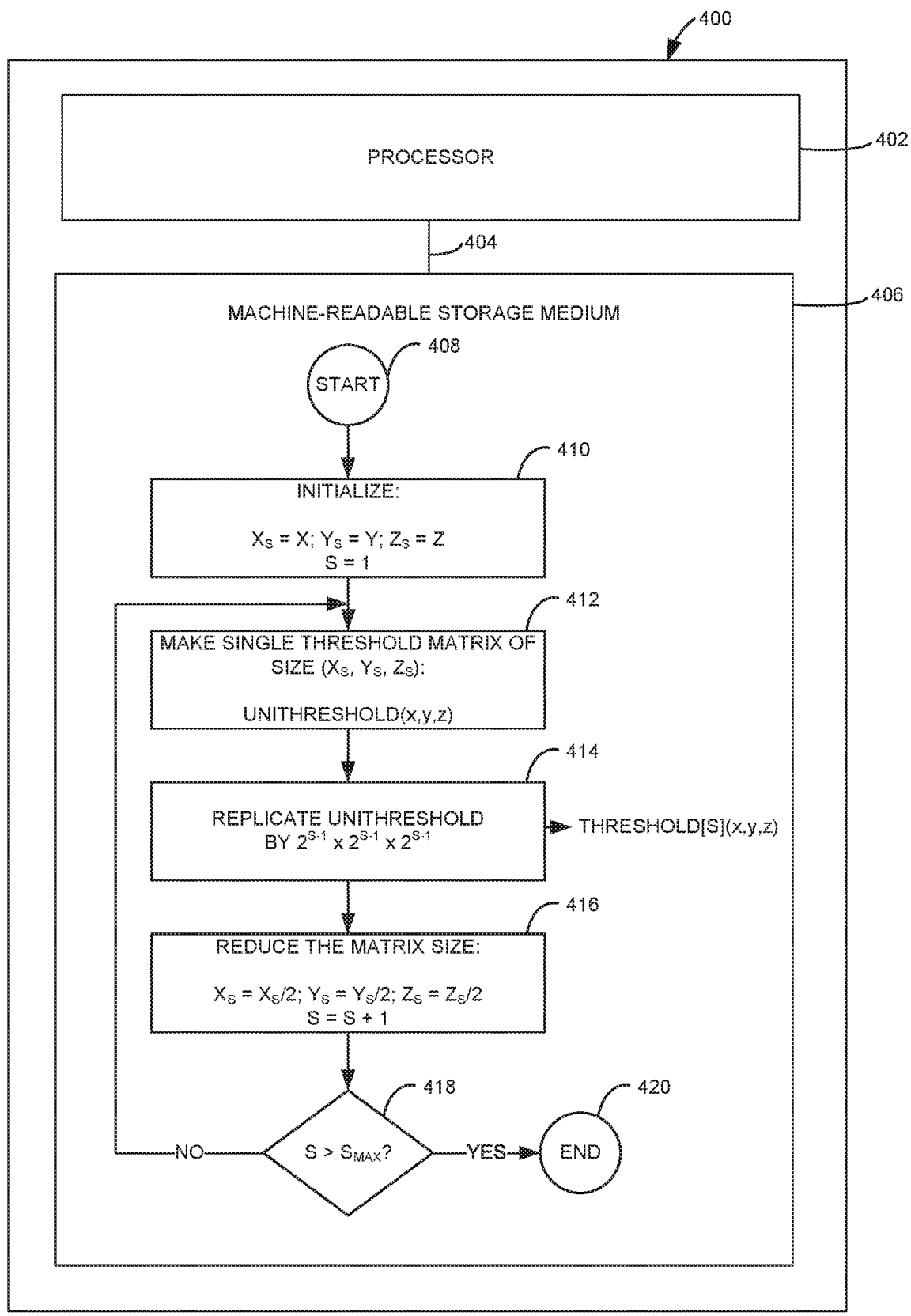
FIG. 4 is a block diagram illustrating one example of a system for generating multiscale density threshold matrices for 3D printing.

FIG. 4 is a block diagram illustrating one example of a system 400 for generating multiscale density threshold matrices for 3D printing. System 400 may implement method 300 previously described and illustrated with reference to FIG. 3B. Additional details for generating multiscale density threshold matrices for 3D printing are also described with reference to system 400.

System 400 includes a processor 402 and a machine-readable storage medium 406. Processor 402 is communicatively coupled to machine-readable storage medium 406 through a communication path 404. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 includes one or more central processing units (CPUs), microprocessors, and/or other suitable hardware devices for retrieval and execution of instructions stored in machine-readable storage medium 406. Processor 402 may fetch, decode, and execute instructions 408-420 to generate a set of multiscale density threshold matrices for 3D printing.

Processor 402 may fetch, decode, and execute instructions 408 to start the generation of the set of multiscale density threshold matrices. Processor 402 may fetch, decode, and execute instructions 410 to initialize the generation of the set of multiscale density threshold matrices. First, the dimensions of the fundamental rectangular period of the density threshold matrix (X, Y, Z) and the maximum number of scales ($S_{MAX}$) to generate are specified. To be sure that the structures will be symmetric, each of the three dimension sizes (X, Y, Z) should be factors of $2^{S_{MAX}-1}$. For example, for a 3-scale system X, Y, and Z should be divisible by 4. Processor 402 initializes three matrix size variables ($X_S$, $Y_S$, $Z_S$) to be equal to the respective dimensions of the fundamental rectangular period as follows: $X_S=X$, $Y_S=Y$, and $Z_S=Z$. Processor 402 also sets a scale variable (S) to one as follows: S=1.

Processor 402 may fetch, decode, and execute instructions 412 to make a single threshold matrix of size ($X_S$, $Y_S$, $Z_S$) to provide UNITHRESHOLD(x, y, z). UNITHRESHOLD (x, y, z) may be provided by first generating a density rank matrix and then normalizing the density rank matrix to generate a density threshold matrix. The density rank matrix may be described as a periodic 3D matrix of size X by Y by Z (i.e., (X, Y, Z)), where each element is an integer indicating the order that the element will turn on a voxel with increasing density. The density rank matrix may be referred to herein as a rectangular periodic matrix, where the density rank matrix provides a rectangular period that tiles all of three-dimensional space. The density rank matrix may provide for the rendering of a variable density 3D object. The density rank matrix may be applied to objects for which the interior needs less material or weight, while still maintaining the object strength.

The density threshold matrix may be described as a matrix for which the rank values in the density rank matrix are converted to threshold values normalized to a range of values used in a continuous density 3D input object. The density threshold matrix may be the same size as the density rank matrix (i.e., (X, Y, Z)). The 3D input object may be described as any object that is to be printed and includes a three-dimensional shape. The 3D input object may include discrete space values that describe the density at each point of the object, from empty space, represented by zero, to solid, represented by a maximum value.

Processor 402 may fetch, decode, and execute instructions 414 to replicate UNITHRESHOLD(x, y, z) by $2^{S-1} \times 2^{S-1} \times 2^{S-1}$ to provide one of the set of multiscale density threshold matrices, THRESHOLD[S](x, y, z). For the first iteration of instructions 414 when S=1, the UNITHRESHOLD(x, y, z) matrix already fills (X, Y, Z) and the replication is 1×1×1.

Processor 402 may fetch, decode, and execute instructions 416 to reduce the matrix size by one half in each dimension and increase the scale variable by one as follows: $X_S=X_S/2$, $Y_S=Y_S/2$, $Z_S=Z_S/2$, and S=S+1. Processor 402 may fetch, decode, and execute instructions 418 to determine whether S is greater than $S_{MAX}$. If S is greater than $S_{MAX}$, then processor 402 may fetch, decode, and execute instructions 420 to end the generation of the set of multiscale density threshold matrices.

If S is not greater than $S_{MAX}$, then processor 402 may fetch, decode, and execute instructions 412 and the process is repeated to generate the next density threshold matrix of the set of multiscale density threshold matrices. The process repeats until all of the density threshold matrices of size (X, Y, Z) are generated. These matrices are a set of numbers between zero and one, with some predetermined number of precision bits, that represent the order in which voxels will be printed when compared to the continuous input density values. As these sets of numbers may be difficult to visualize, FIGS. 5A-5C described below illustrate the first three scales of density threshold matrices by depicting structures that could be rendered by those sets of numbers, respectively.

As an alternative or in addition to retrieving and executing instructions, processor 402 may include one or more electronic circuits comprising a number of electronic components for performing the functionality of one or more of the instructions in machine-readable storage medium 406. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 406 is a non-transitory storage medium and may be any suitable electronic, magnetic, optical, or other physical storage device that stores executable instructions. Thus, machine-readable storage medium 406 may be, for example, random access memory (RAM), an electrically-erasable programmable read-only memory (EEPROM), a storage drive, an optical disc, and the like. Machine-readable storage medium 406 may be disposed within system 400, as illustrated in FIG. 4. In this case, the executable instructions may be installed on system 400. Alternatively, machine-readable storage medium 406 may be a portable, external, or remote storage medium that allows system 400 to download the instructions from the portable/external/remote storage medium. In this case, the executable instructions may be part of an installation package.

Figure 5A:
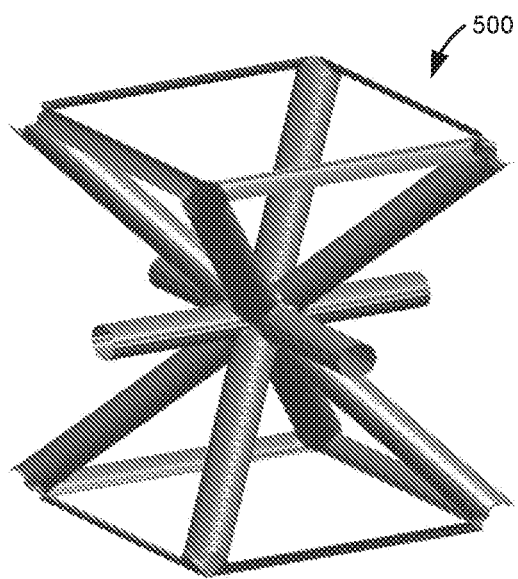
FIG. 5A illustrates one example of a density threshold matrix of scale one.
Figure 5B:
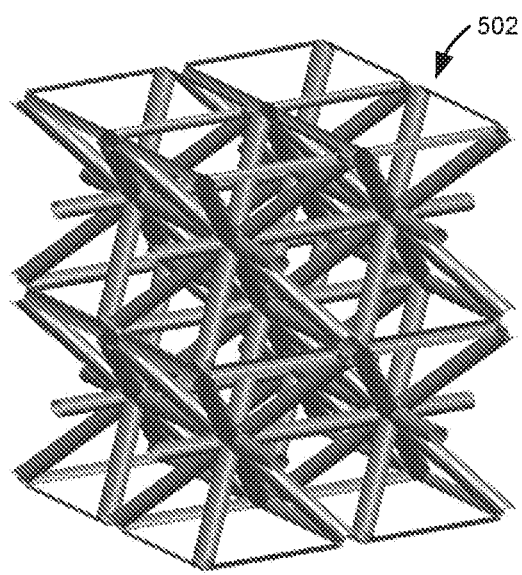
FIG. 5B illustrates one example of a density threshold matrix of scale two.
Figure 5C:
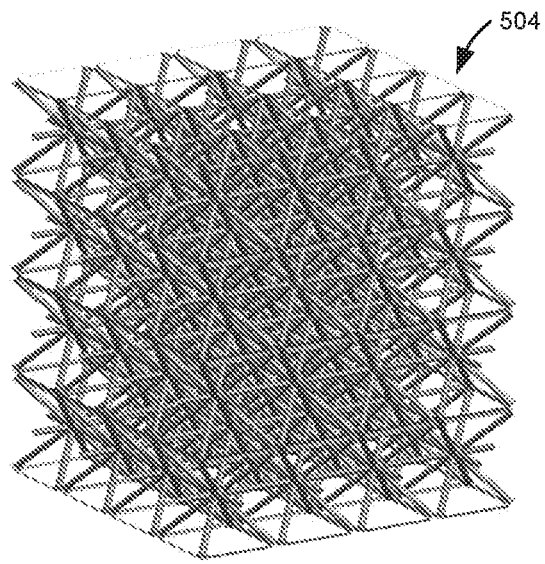
FIG. 5C illustrates one example of a density threshold matrix of scale three.

FIG. 5A illustrates one example of an X by Y by Z density threshold matrix 500 of scale one. Density threshold matrix 500 includes a single matrix. FIG. 5B illustrates one example of an X by Y by Z density threshold matrix 502 of scale two. Density threshold matrix 502 includes 2 by 2 by 2 smaller matrices of size $X_S=X/2$ by $Y_S=Y/2$ by $Z_S=Z/2$. Thus, density threshold matrix 502 includes eight matrices. FIG. 5C illustrates one example of an X by Y by Z density threshold matrix 504 of scale three. Density threshold matrix 504 includes 4 by 4 by 4 smaller matrices of size $X_S=X/4$ by $Y_S=Y/4$ by $Z_S=Z/4$. Thus, density threshold matrix 504 includes 64 matrices. While FIGS. 5A-5C illustrate tetrahedral matrices, other suitably shaped matrices may be used.

Figure 6:
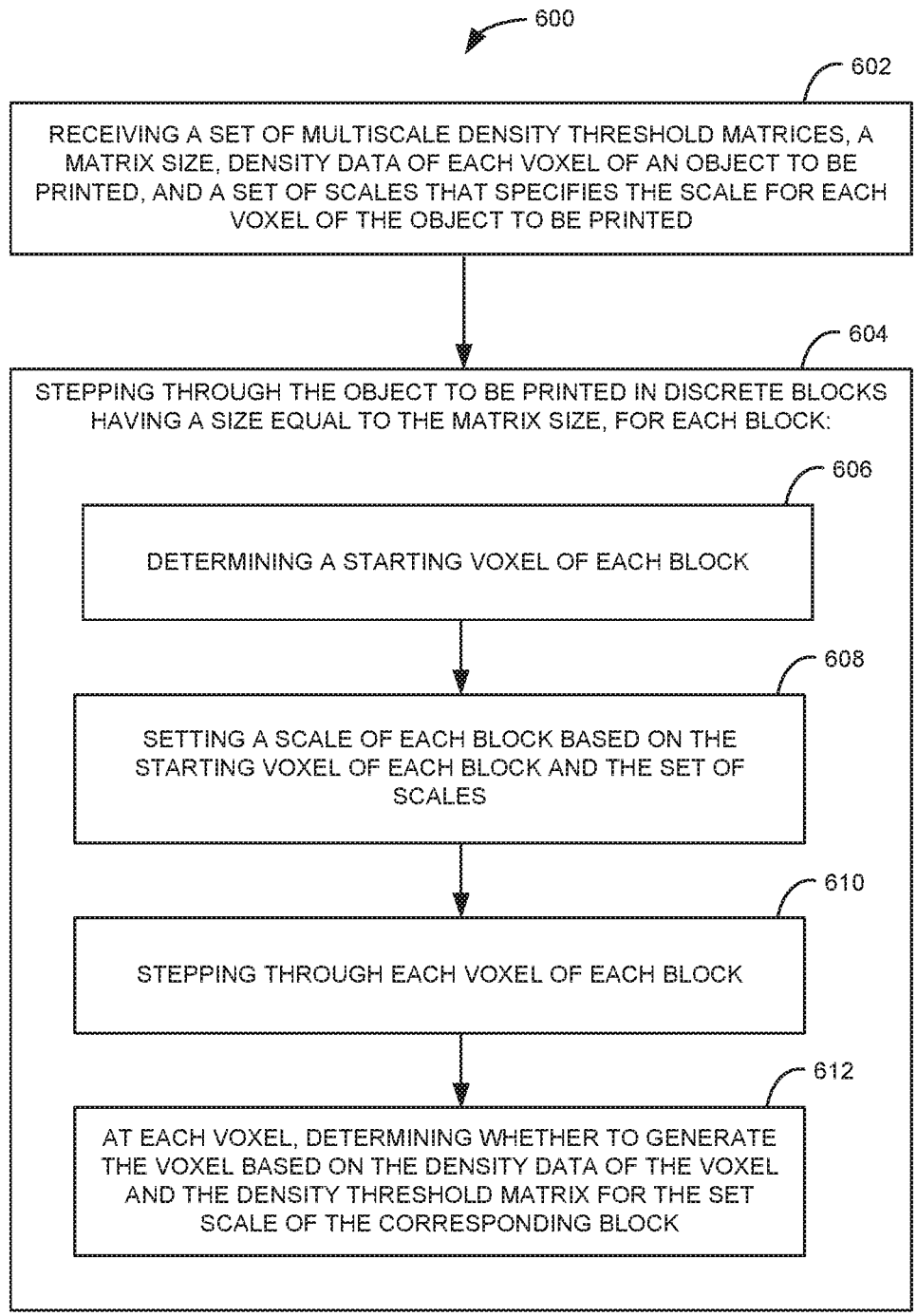
FIG. 6 is a flow diagram illustrating one example of a method for 3D printing an object using multiscale density threshold matrices.

FIG. 6 is a flow diagram illustrating one example of a method 600 for 3D printing an object using multiscale density threshold matrices. In one example, method 600 is performed by a processor, such as processor 702, which will be described with reference to FIG. 7. At 602, method 600 includes receiving a set of multiscale density threshold matrices, a matrix size, density data of each voxel of an object to be printed, and a set of scales that specifies the scale for each voxel of the object to be printed.

In one example, the density data of each voxel of the object to be printed includes a value between zero and one where zero indicates an empty space and one indicates a solid space. The set of scales may specify a first scale for each voxel of a first portion of the object to be printed and a second scale for each voxel of a second portion of the object to be printed where the first portion is more spacious than the second portion. Each density threshold matrix of the set of multiscale density threshold matrices may define struts that may directly contact struts of each of the other density threshold matrices.

At 604, method 600 includes repeating 606, 608, 610, and 612 to step through the object to be printed in discrete blocks having a size equal to the matrix size. At 606, method 600 includes determining a starting voxel of each block. At 608, method 600 includes setting a scale of each block based on the starting voxel of each block and the set of scales. At 610, method 600 includes stepping through each voxel of each block. At 612, method 600 includes at each voxel, determining whether to generate the voxel based on the density data of the voxel and the density threshold matrix for the set scale of the corresponding block.

In one example, wherein determining whether to generate the voxel includes determining whether the density data for the voxel is greater than a corresponding threshold value in the density threshold matrix for the set scale. In response to a determination that the density data is greater than the corresponding threshold value in the density threshold matrix for the set scale, the method includes indicating generation of the voxel. In response to a determination that the density data is less than or equal to the corresponding threshold value in the density threshold matrix for the set scale, the method includes indicating not to generate the voxel.

Figure 7:
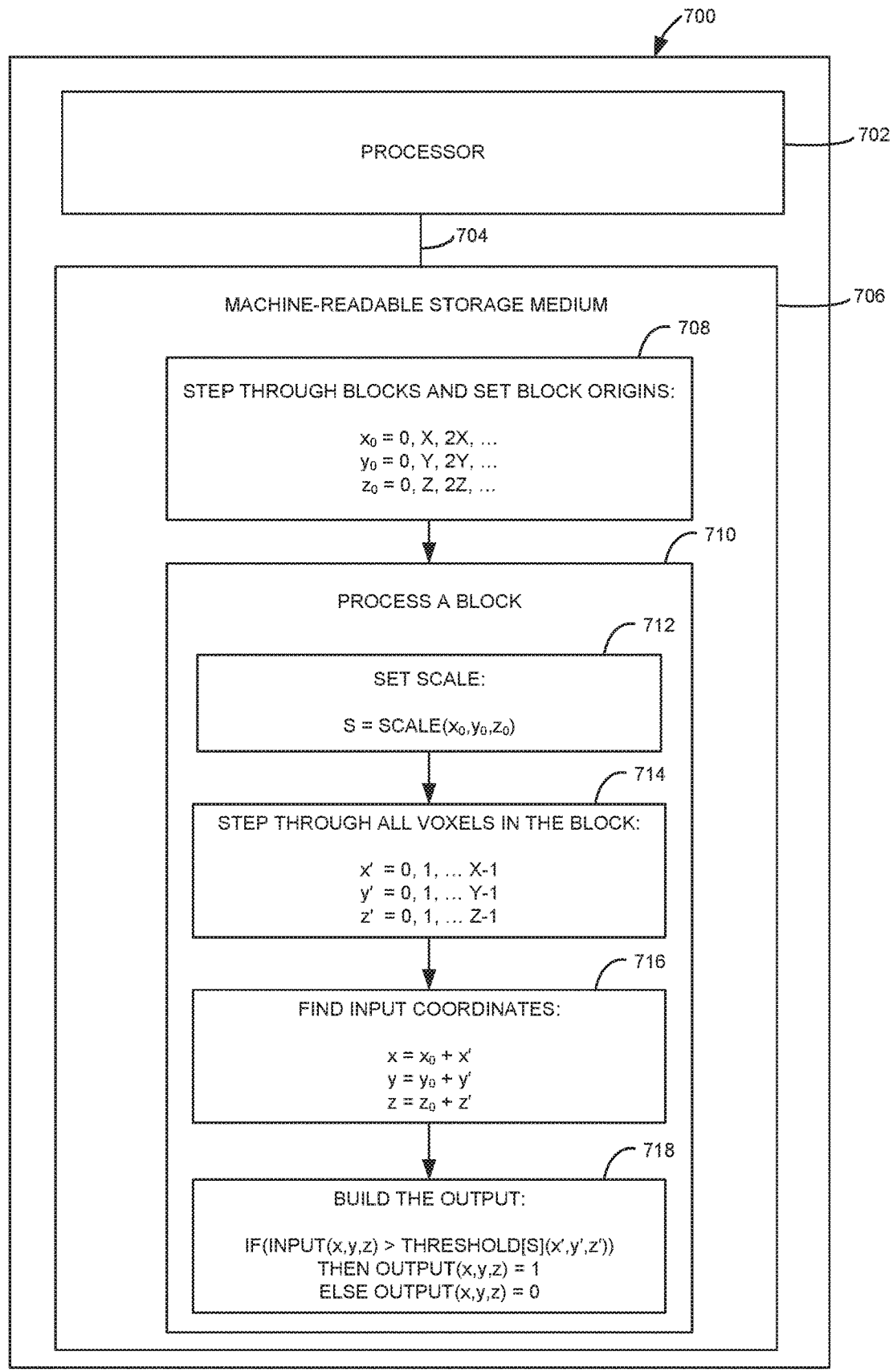
FIG. 7 is a block diagram illustrating one example of a system for 3D printing an object using multiscale density threshold matrices.

FIG. 7 is a block diagram illustrating one example of a system 700 for 3D printing an object using multiscale density threshold matrices. System 700 may implement method 600 previously described and illustrated with reference to FIG. 6. Additional details for 3D printing an object using multiscale density threshold matrices are also described with reference to system 700.

System 700 includes a processor 702 and a machine-readable storage medium 706. Processor 702 is communicatively coupled to machine-readable storage medium 706 through a communication path 704. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 702 includes one or more CPUs, microprocessors, and/or other suitable hardware devices for retrieval and execution of instructions stored in machine-readable storage medium 706. Processor 702 may fetch, decode, and execute instructions 708 and 710 to 3D print an object using multiscale density threshold matrices.

For single-scale 3D density printing, an input object may be described by continuous-tone values that describe the density. Solid portions have a value of one, empty spaces have a value of zero, and values between zero and one describe various levels of density. During the rendering process, a single density threshold matrix is periodically replicated and compared against the input values.

In the multiscale run-time system illustrated in FIG. 7, the inputs to the system include the set of multiscale density threshold matrices, THRESHOLD[S](x, y, z), the matrix size (X, Y, Z), the continuous-tone input object, INPUT(x, y, z), and the input scale, SCALE(x, y, z). The input scale is an integer between 1 and $S_{MAX}$ that specifies the scale intended for each location (x, y, z). One criteria that may be used to determine the scale at each location is the spaciousness of the volume at each location.

Processor 702 may fetch, decode, and execute instructions 708 to step through the entire object in discrete blocks of size (X, Y, Z). The starting point for each block is $(x_0, y_0, z_0)$ such that $x_0=0, X, 2X, \ldots$; $y_0=0, Y, 2Y, \ldots$; and $z_0=0, Z, 2Z, \ldots$ for each block, respectively. Processor 702 may fetch, decode, and execute instructions 710 to process each block including instructions 712, 714, 716, and 718. Processor 702 may fetch, decode, and execute instructions 712 to set the scale for the block. The scale (S) for the entire block is set based on the value of the scale at the starting point $(x_0, y_0, z_0)$ such that $S=SCALE(x_0, y_0, z_0)$. In this way, the scale is prevented from changing inside the block so that no structural discontinuity is formed.

Processor 702 may fetch, decode, and execute instructions 714 to step through all the voxels in the block based on internal block coordinates (x', y', z'). Thus, x'=0, 1, ... X−1; y'=0, 1, ... Y−1; and z'=0, 1, ... Z−1 to step through each voxel in the block. Processor 702 may fetch, decode, and execute instructions 716 to find input coordinates (x, y, z) for each voxel in the block based on the starting point $(x_0, y_0, z_0)$ of the block and the internal coordinates (x', y', z'). Thus, $x=x_0+x'$; $y=y_0+y'$; and $z=z_0+z'$.

Processor 702 may fetch, decode, and execute instructions 718 to build the output. For each voxel of the block, if INPUT(x, y, z) is greater than THRESHOLD[S](x', y', z'), then the output, OUTPUT(x, y, z)=1 to indicate generation (e.g., printing) of the voxel. If INPUT(x, y, z) is not greater than THRESHOLD[S](x', y', z'), then OUTPUT(x, y, z)=0 to indicate not to generate the voxel. The OUTPUT(x, y, z) for the voxel may then be provided to a suitable 3D printer to fabricate that voxel of the object. Processing of the object is complete when all blocks of the object have been processed. System 700 may be used to generate a multiscale output where the structural integrity is preserved at the interface between scales.

As an alternative or in addition to retrieving and executing instructions, processor 702 may include one or more electronic circuits comprising a number of electronic components for performing the functionality of one or more of the instructions in machine-readable storage medium 706. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 706 is a non-transitory storage medium and may be any suitable electronic, magnetic, optical, or other physical storage device that stores executable instructions. Thus, machine-readable storage medium 706 may be, for example, RAM, an EEPROM, a storage drive, an optical disc, and the like. Machine-readable storage medium 706 may be disposed within system 700, as illustrated in FIG. 7. In this case, the executable instructions may be installed on system 700. Alternatively, machine-readable storage medium 706 may be a portable, external, or remote storage medium that allows system 700 to download the instructions from the portable/external/remote storage medium. In this case, the executable instructions may be part of an installation package.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method to generate a set of multiscale density threshold matrices for three-dimensional printing, the method comprising:

specifying, via a processor, dimensions of a fundamental rectangular period of a density threshold matrix and specifying a maximum number of scales to generate for use within a single three-dimensional printed object; and generating, via the processor, a density threshold matrix for each scale based on the fundamental rectangular period to provide the set of multiscale density threshold matrices to be used within the single three-dimensional printed object.

2. The method of claim 1, wherein generating the density threshold matrix for each scale based on the fundamental rectangular period to provide the set of multiscale density threshold matrices comprises:

initializing, via the processor, a scale value to one and initializing a matrix size to the dimensions of the fundamental rectangular period; and via the processor, repeating until the scale value is greater than the maximum number of scales:

generating a single threshold matrix having a size corresponding to the matrix size;

replicating the single threshold matrix based on the scale value to provide one density threshold matrix of the set of multiscale density threshold matrices;

reducing the matrix size by dividing each dimension of the matrix size by two; and setting the scale value equal to the scale value plus one.

3. The method of claim 2, wherein each of the dimensions of the fundamental rectangular period is a factor of two to the power of the maximum number of scales minus one.

4. The method of claim 2, wherein replicating the single threshold matrix comprises replicating the single threshold matrix by two to the power of the maximum number of scales minus one for each dimension of the single threshold matrix.

5. The method of claim 2, wherein the set of multiscale density threshold matrices defines a set of tetrahedral matrices or a set of cubic matrices.

6. A system comprising:

a machine readable storage medium storing instructions; and a processor to execute the instructions to:

specify dimensions of a fundamental rectangular period of a density threshold matrix and specify a maximum number of scales to generate for use within a single three-dimensional printed object; and generate a density threshold matrix for each scale based on the fundamental rectangular period to provide the set of multiscale density threshold matrices to be used within the single three-dimensional printed object.

7. The system of claim 6, wherein the processor is to execute the instructions to generate the density threshold matrix for each scale based on the fundamental rectangular period to provide the set of multiscale density threshold matrices comprising:

initialize a scale value to one and initialize a matrix size to the dimensions of the fundamental rectangular period; and repeat until the scale value is greater than the maximum number of scales:

generate a single threshold matrix having a size corresponding to the matrix size;

replicate the single threshold matrix based on the scale value to provide one density threshold matrix of the set of multiscale density threshold matrices;

reduce the matrix size by dividing each dimension of the matrix size by two; and set the scale value equal to the scale value plus one.

8. The system of claim 7, wherein each of the dimensions of the fundamental rectangular period is a factor of two to the power of the maximum number of scales minus one.

9. The system of claim 7, wherein the processor is to execute the instructions to further replicate the single threshold matrix by two to the power of the maximum number of scales minus one for each dimension of the single threshold matrix.

10. The system of claim 7, wherein the set of multiscale density threshold matrices defines a set of tetrahedral matrices or a set of cubic matrices.

11. A non-transitory machine-readable storage medium storing instructions for causing a processor to perform the method of:

specifying, via a processor, dimensions of a fundamental rectangular period of a density threshold matrix and specifying a maximum number of scales to generate for use within a ksingle three-dimensional printed object; and generating, via the processor, a density threshold matrix for each scale based on the fundamental rectangular period to provide the set of multiscale density threshold matrices to be used within the single three-dimensional printed object.

12. The non-transitory machine-readable storage medium of claim 11, wherein generating the density threshold matrix for each scale based on the fundamental rectangular period to provide the set of multiscale density threshold matrices comprises:

initializing, via the processor, a scale value to one and initializing a matrix size to the dimensions of the fundamental rectangular period; and via the processor, repeating until the scale value is greater than the maximum number of scales:

generating a single threshold matrix having a size corresponding to the matrix size;

replicating the single threshold matrix based on the scale value to provide one density threshold matrix of the set of multiscale density threshold matrices;

reducing the matrix size by dividing each dimension of the matrix size by two; and setting the scale value equal to the scale value plus one.

13. The non-transitory machine-readable storage medium of claim 12, wherein each of the dimensions of the fundamental rectangular period is a factor of two to the power of the maximum number of scales minus one.

14. The non-transitory machine-readable storage medium of claim 12, wherein replicating the single threshold matrix comprises replicating the single threshold matrix by two to the power of the maximum number of scales minus one for each dimension of the single threshold matrix.

15. The non-transitory machine-readable storage medium of claim 12, wherein the set of multiscale density threshold matrices defines a set of tetrahedral matrices or a set of cubic matrices.

* * * * *